April 27, 1937. S. A. FORTER 2,078,794
METHOD AND APPARATUS FOR MELTING
Filed July 2, 1932 3 Sheets—Sheet 3

INVENTOR
Samuel A. Forter
By Byrnes, Stebbins,
Parmelee & Tuebo
His Attys.

Patented Apr. 27, 1937

2,078,794

UNITED STATES PATENT OFFICE 2,078,794

METHOD AND APPARATUS FOR MELTING

Samuel A. Forter, Bellevue, Pa., assignor, by mesne assignments, to Hartford-Empire Company, Hartford, Conn., a corporation of Delaware Application July 2, 1932, Serial No. 620,651

8 Claims. (Cl. 49—54)

The present invention relates broadly to the art of glass working, and more particularly to a novel method and apparatus for more effectively melting a glass batch and maintaining a melted body of glass in position for effective use.

With the usual type of glass furnace, the batch is charged into the furnace adjacent one end thereof directly into a bath of molten glass, usually through a dog-house, and as the batch melts it travels progressively from the charging end of the furnace to the working end thereof. During this travelling operation the mass of unmelted batch gradually decreases, it being contemplated that by the time the working end of the furnace is reached the batch will be entirely melted. In some cases complete melting is not accomplished during such travel, with the result that the glass at the working end of the furnace is not in proper condition for fabrication into sheets, plates or articles of a blown or pressed nature.

Such charging operations are also objectionable for the reason that a portion of the fines constituting the batch are subjected to the draughts within the furnace so that they are carried about in the furnace atmosphere and, in many cases, out from the furnace. This is particularly true of the lime and soda content, it being customary in many factories to compensate for the quantity of lime and soda which is thus pulled away by increasing their percentage in the original batch.

With some of the later installations an attempt has been made to overcome the difficulties referred to by charging the batch material into a furnace adjacent an inclined surface and subjecting it to a melting temperature while maintaining it in a relatively thin and spread out condition. Such an arrangement is shown for example in the U. S. patent to Frink No. 1,863,156. I have found that while such a spread out condition is highly desirable from the standpoint of effective melting of the batch, that in order to obtain the best results several conditions must be properly correlated. In the first place, the quantity of batch in unmelted condition should be maintained substantially constant. This requires that the batch be fed to the furnace at substantially the melting rate of which the furnace is capable.

I have also found that the most efficient results can only be obtained where the glass batch is fed into the furnace in substantially the zone of highest temperature so that it is initially subjected within the furnace to the highest temperature conditions. While the point of charging the batch is preferably higher than the normal glass level in the working end of the furnace, as suggested for example in the patent referred to, I have found that the operation of the furnace is improved if the feed of the batch into the high temperature zone takes place in a substantially vertical direction, although this is not essential, and is supported by a mass of batch which is substantially continuously subjected to a cooling influence.

The glass batch having been initially subjected to the highest temperature is then permitted to flow by gravity over an inclined surface in generally spread out or film-like condition and subjected, during its travel over such surface, to the heating action of gases travelling in the direction of glass flow and preferably at a substantially constant velocity.

With a furnace answering the above requirements, it is possible to initiate a charging operation by the use of cullet which is not susceptible to blowing around as is the case with lime, soda and the like. After the desired glazed conditions have been formed on top of the charge and along the inclined surface, batch may be substituted for cullet and the operation continued with the assurance that at all times the upper surface of the batch will present a substantially glazed condition which precludes undesirable dissipation of the batch contents.

The desired melting having been obtained, it is desirable that the molten glass be fed into the main body of glass in the working chamber without any abrupt change in its direction, such for example as is occasioned by a movement over a shoulder or the like. Such a movement, in the nature of a miniature cataract, tends to trap air in the body of glass. In accordance with my invention, the film of molten glass gradually merges with the main body of glass in the working chamber without any abrupt change in its direction of flow.

The present invention further contemplates a construction embodying novel features with respect to the control of the combustion gases and the relative location of the firing ports, charging opening, throat between the melting and working zones, and the position of the offtake port or ports.

In the accompanying drawings I have shown more or less diagrammatically, by way of illustration only, a preferred embodiment of the present invention. In the drawings—

Figure 1:
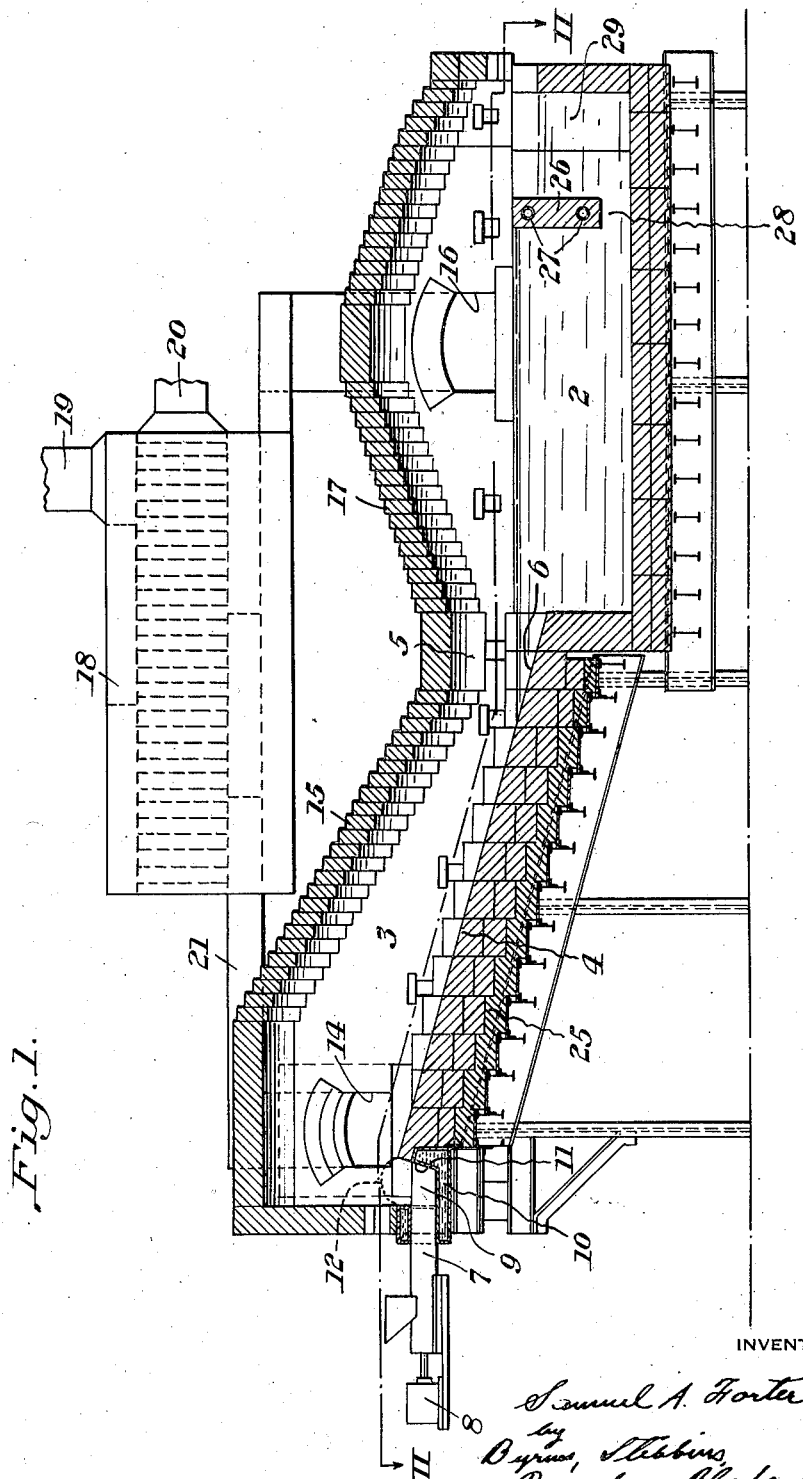
Figure 1 is a longitudinal sectional view through one form of furnace constructed in accordance with my invention.

In accordance with the present invention, there is provided a glass furnace which comprises generally a working zone 2 and a melting zone 3. The working zone may be of any usual construction depending upon the particular form of apparatus to be utilized with the furnace, and effective for maintaining the desired body of molten glass therein.

The melting zone is of novel construction. It comprises an inclined hearth or melting floor 4 which is clearly shown in Figure 1 as being gradually and uniformly inclined downwardly in a direction toward the working zone. Intermediate the melting zone and the working zone is a restricted throat 5 having an inclined surface 6 which constitutes a flow connection between the hearth 4 and the body of glass in the working zone 2, it being noted from Figure 1 that the surfaces 4 and 6 gradually merge one into the other without any abrupt change in the direction of flow thereover.

Adjacent the extreme upper end of the hearth 4 is a batch charger 7 which is herein illustrated as being of the screw type driven by a motor 8 for continuously feeding batch in regulable quantities, depending upon speed of rotation of the screw, into a batch receiving space 9. The bottom of this space is formed by a cooler 10 adapted to have water supplied thereto continuously from any desired source and in any desired manner. The front end 11 of the cooler is upwardly inclined so as to cause batch delivered thereto by the batch charger to move upwardly into substantially the position indicated by the dotted line 12.

The batch in this position, which is materially above the level of the molten glass in the working zone, is subjected to high temperature combustion obtained by the admission of gases through opposed ports 14 on opposite sides of the batch space and substantially in line therewith. The burning gases discharged from these two ports meet substantially over the batch, thereby continuously subjecting the upper portion of the batch to a melting temperature while the lower portion is supported by a cooled base of freshly charged batch which is gradually moved upwardly into melting position.

By reference to Figure 1 of the drawings, it will be noted that the entire port area 14 is above the top of the throat 5, and that the roof 15 of the melting zone gradually converges downwardly until it joins with the roof of the throat. Thus the combustion gases in order to pass from the ports 14 through the throat 5 are caused to move in a definite downward direction, which insures maintaining them in intimate heat conducting relationship to the film of melting batch gradually flowing downwardly over the hearth 4, in such manner that completion of the melting is definitely insured by the time the glass reaches the throat 5.

In accordance with the preferred embodiment of my invention, the downward sloping of the roof 15 is preferably determined substantially by the rate at which the hot products of combustion, due to cooling, decrease in volume. With such a condition, the velocity of gas flow from the ports 14 to the throat 5 is substantially constant, the decrease in volume of the gases being offset by the decrease in the flow area provided.

The batch having been melted, the molten glass and the hot gases travel in intimate contact through the restricted throat area of the throat 5. During this time, the freshly molten glass gradually merges with the body of glass in the working zone, while the products of combustion are permitted to pass to suitable outlet ports 16 communicating with the working zone.

To those skilled in the art it will be apparent that the working zone constitutes a refining chamber, in which a relatively lazy flow of the gases is desirable. To insure this condition, the roof 17 of the working zone slopes upwardly to provide a gradually increasing space for the products of combustion before they reach the discharge ports.

In accordance with the preferred embodiment of my invention, the outlet ports 16 are preferably so disposed that their complete outlet area lies below the inlet area of the ports 14, thereby further insuring a continuous down-draft condition of the products of combustion from the inlet to the outlet ports, with an intimate heat transfer relationship continuously maintained between the heating gases and the glass.

In the drawings I have diagrammatically illustrated the outlet gases as passing into a suitable regenerator or recuperator 18 having an air admission opening 19 and a combustion gas outlet 20. In this heat transfer unit, the combustion gases give up a large portion of their heat to the air supplied through the intake 19, and the heated air is in turn fed by suitable conduits 21 to the ports 14.

Figure 3:
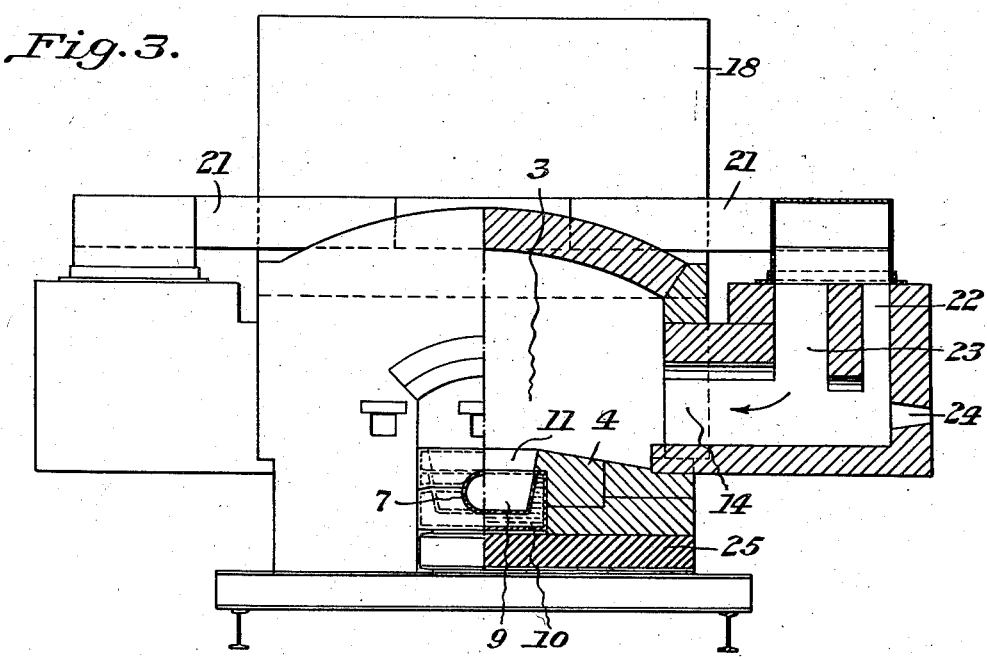
Figure 3 is a detail transverse sectional view along the line III—III of Figure 2.
Figure 4:
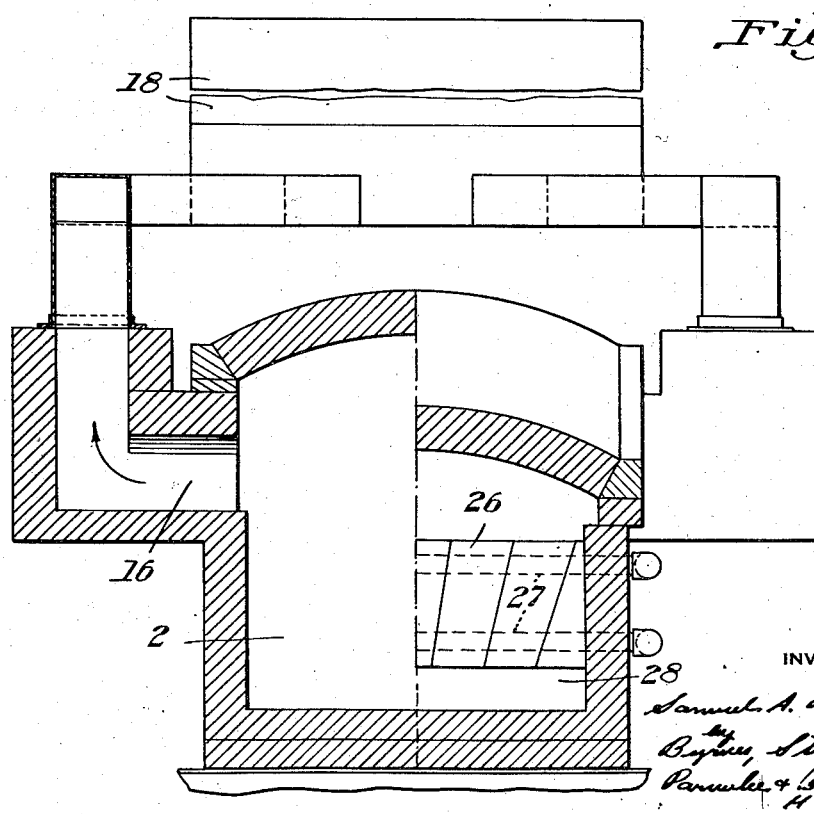
Figure 4 is a detail sectional view along the line IV—IV of Figure 2.

In Figure 3, I have shown the combustion ports as being of such construction as to provide a primary air flow passage 22 and a secondary air flow passage 23. Communicating with the primary air passage 22 is a gas inlet port 24, so that the gases initially come into contact with a primary portion of the highly heated air and subsequently mix with the major portion or secondary portion of this air.

From the foregoing decription it will be noted that a furnace constructed in the manner described is characterized by the charging of batch into the furnace at the hottest point and then feeding the melting batch downwardly in distributed or film-like condition in intimate contact with gases travelling in the same direction and at substantially a constant velocity. By having the point of charge of the batch higher than the normal glass level, a gravity feed over the hearth 4 is continuously maintained.

By properly correlating the speed of the batch charger to the melting rate of the furnace, I may maintain the position 12 of the batch substantially constant, the melting surface being continuously re-supplied as the exposed portion thereof melts away.

The downward slope of the roof 15 in the melting zone, in addition to insuring a substantially uniform gas velocity, is further desirable in that due to the fact that it gradually approaches the glass, it comes into better and better heat radiating relationship to the film of glass. I have found that with a slope such that the flow area varies substantially directly as the decrease in the volume of gases, that the rate of radiation to the glass increases with sufficient rapidity so that substantially the same temperature can be maintained throughout the length of the hearth 4. This increased heating by radiation compensates for the decreased heat transfer by convection as the heating gases drop in temperature.

By reference more particularly to Figure 1 of the drawings, it will be noted that the relationship of the parts in the melting zone, the throat, and the portion of the working zone adjacent the throat is such as to provide a generally Venturi shaped structure. In this Venturi shaped structure the contracting portion of the venturi comprises the melting zone wherein the gases are caused to travel with the glass and in intimate contact therewith, and preferably at a substantially constant velocity due to the rate of contraction of this portion. In the throat of the venturi, which throat constitutes the point of gas offtake for the melting zone, and which is lower than the point of inlet for the heating gases to the melting zone, the same intimate relationship is continued.

In addition to this, the throat provides the means for gradually merging the molten film of glass, or other material, with the body of molten material in the working zone without any disturbance in the direction or manner of flow such as would tend to trap air or otherwise disturb the desired conditions. Upon leaving the throat, the gases are permitted to gradually expand in the expanding portion of the venturi so as to give the desired lazy flow conditions in the working zone. While it is entirely possible that the working zone might be constructed so as not to provide an expanding portion of the character herein referred to, I have found that such a construction possesses desirable characteristics. It is to be understood, however, that in the broader claims there is no limitation in this respect.

By initially charging a furnace of this construction with cullet so as to obtain a glaze substantially continuously over the hearth 4 and at the top of the incoming batch, I can thereafter maintain a molten or glazed surface continuously by substituting batch for the cullet.

In the embodiment of the invention illustrated, the glass batch is shown as having a generally upward movement which is in reality at least partly a component or resultant movement of the inward feed and the generally upwardly extending wall opposing the feeding movement. While such a construction has certain advantages in that it enables the actual bottom of the batch to be continuously cooled so as to prevent the melting effect from extending downwardly into the batch, it will be understood that it is possible to feed the batch in at substantially the hearth level and in substantially a horizontal direction while continuing some of the advantages of the invention. It will be understood therefore that the invention is not limited in this respect, except where such a construction is particularly pointed out.

In order to minimize to as great an extent as possible heat losses by conduction through the hearth 4, I preferably shield it by an adjacent layer of insulation 25.

Figure 2:
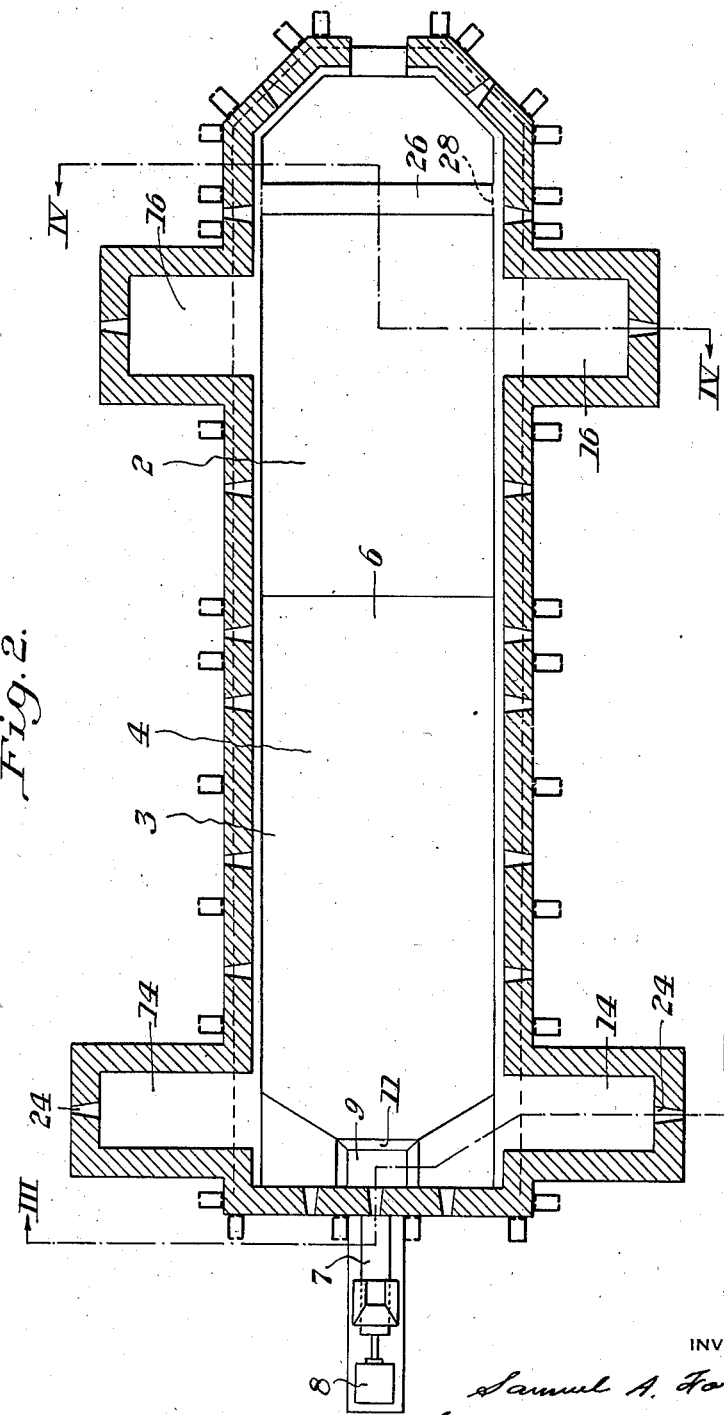
Figure 2 is a horizontal sectional view along the line II—II of Figure 1, looking in the direction of the arrows.

By reference to Figure 2 of the drawings, it will be noted that the furnace herein provided preferably has a substantially constant width throughout the melting zone, the throat and the working zone. This constancy is desirable in that it eliminates the possibility of more or less stagnant bodies of glass wherein devitrification is likely to occur. While the working zone, as before pointed out, may be of any desired construction in accordance with conditions under which the furnace is to operate, I have herein illustrated a construction including a jack arch 26 extending transversely of the furnace and preferably comprising refractory blocks through which extend water cooling pipes 27 not only for giving increased life to the arch, but for the purpose of supporting it rigidly in position. This arch serves to effectively skim the glass flowing through the restricted opening 28 between the bottom of the arch and the bottom of the working zone, thereby maintaining a body 29 of molten material in the best possible condition for use.

For purposes of a better understanding of the invention, I have illustrated it as applied specifically to the problem of melting glass, wherein the constituent batch materials are fed to the melting zone. The construction of the parts is such, however, that many of the features may be advantageously utilized in the melting of other materials, and to this end it will be noted that many of the claims are directed broadly to a method or apparatus for melting without regard to the particular material which is being melted.

The advantages of the invention will be fully apparent from the foregoing description.

Certain of the features disclosed herein and in my application Serial No. 631,818, filed September 6, 1932, are claimed in that application.

While I have herein illustrated and described a preferred method and apparatus for carrying out my invention, it will be understood that changes in the construction and relationship of the parts may be made without departing either from the spirit of my invention or the scope of my broader claims.

I claim:

1. In the method of making molten material, the steps comprising supplying constituent material to a furnace in substantially the zone of highest temperature therein, and causing it to flow from said zone over a downwardly inclined supporting surface while subjecting it to a melting temperature below that in said zone and while maintaining it in thin and spread-out condition into a working zone, the material being contained within the furnace while melting is brought about.

2. In the method of melting material, the steps comprising directing hot gases onto an inclined stationary refractory support, moving the material beneath the hot gases over said support, and causing such gases to move over the material in the direction of flow of the material over the support.

3. In the method of melting, the steps comprising directing hot gases onto an inclined stationary refractory support, moving the material beneath the hot gases over said support, causing such gases to move over the material in the direction of flow of the material over the support, and maintaining the flow of gases substantially constant.

4. In the method of melting, the steps comprising moving the material through a melting zone over an inclined stationary refractory support, passing hot gases into the melting zone above the material, causing such gases to move over the material in the direction of flow of the material over the support, and taking off said gases from said zone at a point lower than their admission point.

5. In the method of melting glass, the steps comprising moving constituent material in a generally upward direction into substantially the hottest zone of a furnace, cooling the supporting portion of the constituent material, gradually moving the supporting portion of the material upwardly into melting position, spreading the material out, passing it downwardly by gravity in thin and spread out condition over an inclined supporting surface, and moving the heating medium downwardly while in contact with material on such surface and in the direction of movement thereof.

6. In the method of melting glass, the steps comprising moving constituent material in a generally upward direction into substantially the hottest zone of a furnace, cooling the supporting portion of the constituent material, gradually moving the supporting portion of the material upwardly into melting position, spreading the material out, passing it downwardly by gravity in thin and spread out condition over an inclined supporting surface, and moving the heating medium downwardly while in contact with material on such surface and in the direction of movement thereof at a substantially constant velocity.

7. In a glass melting apparatus, an inclined melting hearth, means including an upwardly directed inlet for feeding batch from underneath to the upper end of said hearth, means for supplying heating gases adjacent the position of batch supply, and means for directing the heating gases over said hearth in the direction of flow of the melted batch thereover.

8. In a glass melting apparatus, an inclined melting hearth, means for supplying batch to the upper end of said hearth, means for supplying heating gases adjacent the position of batch supply, and means for directing the heating gases over said hearth in the direction of flow of the melted batch thereover, said last mentioned means including a roof portion downwardly inclined in converging relation to the hearth.

SAMUEL A. FORTER.